United States Patent [19]

Cluniat

[11] Patent Number: 4,538,180
[45] Date of Patent: Aug. 27, 1985

[54] SYSTEM FOR NON LINEARITY CORRECTION BY INTERMEDIATE FREQUENCY PREMODULATION IN TELEVISION EQUIPMENT

[75] Inventor: Claude Cluniat, Chatou, France

[73] Assignee: LGT Laboratoire General des Telecommunications, Chatou, France

[21] Appl. No.: 457,624

[22] Filed: Jan. 13, 1983

[30] Foreign Application Priority Data

Jan. 28, 1982 [FR] France ................. 82 01354

[51] Int. Cl.³ .................. H04N 5/38; H04N 5/40
[52] U.S. Cl. ................. 358/186; 358/167; 307/511; 328/155; 455/102; 455/302
[58] Field of Search ........... 358/186, 160, 187, 167; 307/511; 330/124 R; 328/155, 133; 455/102, 103, 305, 302; 332/18

[56] References Cited

U.S. PATENT DOCUMENTS

| | | | |
|---|---|---|---|
| 3,628,162 | 12/1971 | Lunden et al. | 328/155 |
| 4,249,214 | 2/1981 | Boyd | 358/186 |
| 4,392,252 | 7/1983 | Cluniat | 358/186 |

FOREIGN PATENT DOCUMENTS

2299759 8/1976 France .

OTHER PUBLICATIONS

"Correction of Phase Distortion in a TV Transmitter at Radio Frequencies", vol. 29/30, No. 11 (1975), pp. 19-25, by M. M. Kozlovskiy et al, *Telecommunication and Radio Engineering*.

"20 KW UHF Television Transmitter with All Solid State Driver for Klystron Amplifiers", *Electrical Communication*, vol. 48, No. 4 (1973), pp. 436-443, by J. Irmer et al.

*Primary Examiner*—Tommy P. Chin
*Assistant Examiner*—Michael D. Parker
*Attorney, Agent, or Firm*—Cushman, Darby & Cushman

[57] ABSTRACT

In equipment for transmitting or re-transmitting television signals comprising, in the intermediate frequency stage, group propagation time correction cells for linearizing the phase-frequency characteristic of the equipment, the non linearity correction system of the invention uses these cells while completing them with an amplitude pre-modulation control circuit and/or a frequency premodulation control circuit, for correcting amplitude and phase non linearities affecting the pole carrier frequencies of the correction cells.

9 Claims, 5 Drawing Figures

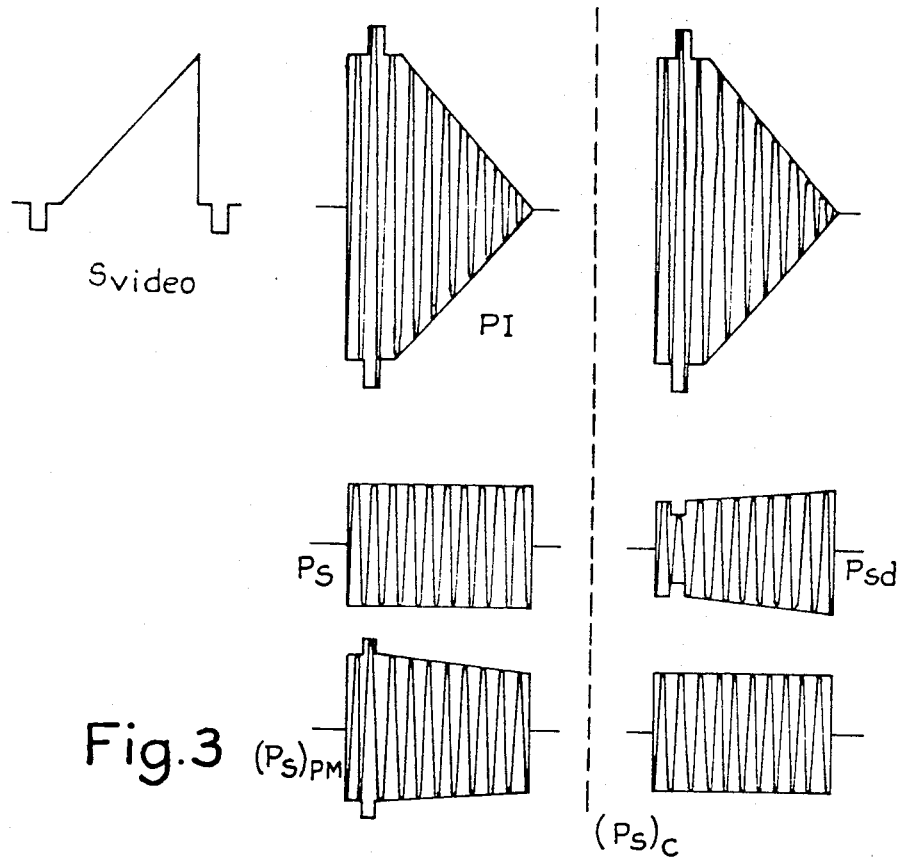
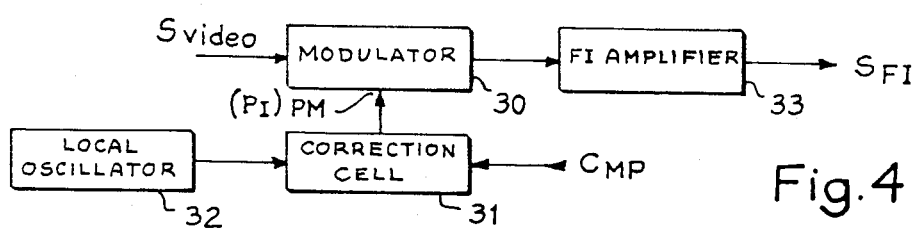
Fig.4
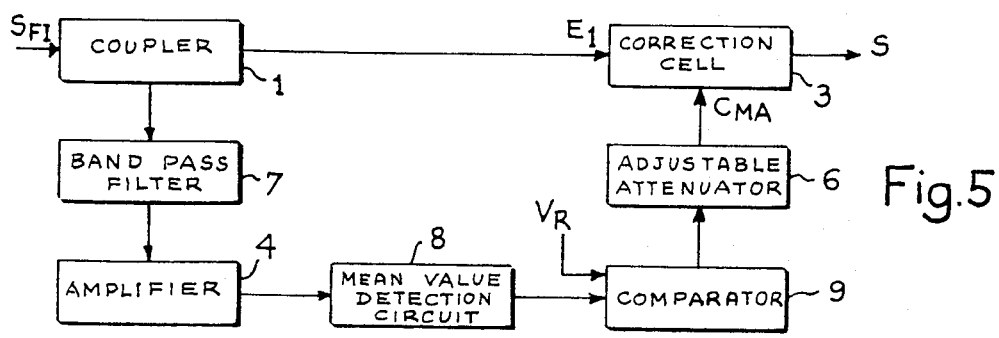
Fig.5

SYSTEM FOR NON LINEARITY CORRECTION BY INTERMEDIATE FREQUENCY PREMODULATION IN TELEVISION EQUIPMENT

BACKGROUND OF THE INVENTION

The invention relates to television signal transmitting equipment and more particularly to a system for correcting non-linearities by intermediate frequency pre-modulation.

In equipment for transmitting or re-transmitting television signals by common channel (in which the image and sound components are amplified simultaneously in the same power amplifier), at the present time provision is made for considerably reducing the amplitude non linearities of the signal amplified by the amplifier by pre-correcting the signal by means of a non-linearity generator providing amplitude pre-modulation of the high frequency signal to be transmitted, before amplification. During amplification, the nonlinearities generated by the amplifier are compensated by the non linearities generated by the non-linearity generator. With this correcting device, very good results are obtained, the intermodulation being improved by 12 to 14 decibels. This same device also provides a reduction by 12% of the cross-modulation, which is the transfer of the amplitude modulation of the image component to the sound carrier. But, the intermodulation and cross-modulation minima are not generally obtained under the best conditions. It is then not possible from this correcting device alone to minimize simultaneously the intermodulation and cross-modulation.

Moreover, the non-linearity of the common power amplifier further produces other defects of the different carriers which cannot be corrected by this device. This is the case for example for amplitude distortions of the type such as compression of the sync pulses on the image carrier; it is also the case for differential gain variations at the frequency of the chrominance sub-carrier. Finally, there also exist other uncorrected defects of the incidential phase type, that is to say phase modulation of the image carrier as a function of its modulation level, i.e. of the level of the videofrequency signal.

As already mentioned, these defects have in common the fact that they occur at given frequencies in the composite signal spectrum and are a function of the videofrequency signal.

Furthermore, the common power amplifier introduces phase non linearities because of the non linearity of its phase-frequency characteristic. In television equipment, provision is also made for correcting these non linearities by using differential phase corrector devices, placed in the intermediate frequency stages, which are normally constructed so as not to introduce amplitude distortions. Patent application No. 7 35448 describes such a differential phase corrector device formed from correction cells which allow a variable phase shift to be introduced, about poles at frequencies selected by the corrector device, without affecting the amplitude of the signal. With such a device, phase distortions may for example be corrected which are introduced on to the chrominance carrier by the luminance signal.

SUMMARY OF THE INVENTION

The invention provides a system for correcting the residual amplitude or phase non linearities of the different carriers forming the composite signal, by pre-modulation of some parameters which vary independently in the correction cells initially provided for the differential phase correction and placed in the intermediate frequency stages, by using additional circuits for controlling these parameters.

The residual defects capable of being corrected by this system are in particular residual cross-modulation at the frequency of the sound carrier, compression of the line sync pulses at the frequency of the image carrier, variations of the mean value of the sound carrier and variations in the level of the chrominance sub-carrier for adjusting the differential gain. The incidential phase, that is to say the phase modulation of the carrier as a function of the level of the videofrequency signal may also be corrected by this system.

In fact, because of the construction of the correction cells, their gain, frequency and group delay time may be controlled independently and a correction system with a plurality of cells tuned to different poles allows control of these corrections to be used as a function of control signals taken from the videofrequency signal.

The invention provides a system for correcting non-linearities by intermediate frequency pre-modulation for precorrecting non linearities introduced into a high frequency amplified television signal in common channel transmission equipment, comprising at least one group delay time correction cell placed in the intermediate frequency stages. The cell comprises a direct channel and a compensated channel in which the signals are added. The compensated channel comprises an amplifier connected to a group delay time modulation circuit having a delay time control input and being tuned to the frequency of a correction pole by an oscillating circuit, this circuit not affecting the amplitude of the signal at the frequency of the correction pole, said system further comprises an amplitude pre-modulation control circuit having a control input and whose output is coupled to the amplifier for controlling amplitude corrections, at the frequency of the correction pole, independent of the group delay time correction introduced at the same frequency.

BRIEF DESCRIPTION OF THE DRAWINGS

The invention will be better understood and other features will appear from the following description with reference to the accompanying figures:

FIG. 3 is an explanatory signal diagram.

FIG. 4 is a block diagram of a second embodiment of the correction system of the invention, applied to incidential phase correction.

FIG. 5 is a block diagram of a third embodiment of the correction system of the invention, applied to the correction of the mean value of the sound carrier.

DESCRIPTION OF THE PREFERRED EMBODIMENTS

Figure 1:
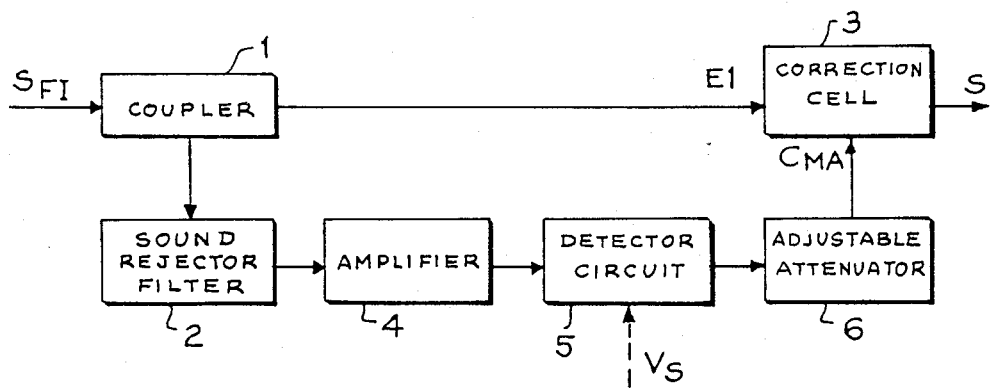
FIG. 1 is a block diagram of a first embodiment of the correction system of the invention, applied to cross-modulation correction.

In FIG. 1, which shows a first embodiment of a correction system applied to the correction of residual crossmodulation, a composite image and sound intermediate frequency television signal $S_{FI}$ is applied to the input of a coupler 1 which takes a part of this signal to feed it to the input of a sound rejector filter 2 whose output delivers an intermediate frequency signal which no longer contains the sound components. The main output of coupler 1 is connected to the signal input E1 of a correction cell 3. This correction cell has an amplitude pre-modulation control input $C_{MA}$ to which is applied a control signal obtained from the image signal in the following way : the output of the sound rejector filter 2 is connected to the input of an amplifier 4 whose output is connected to the input of a detector circuit 5. This detector circuit delivers at its output the detected image video-frequency signal. The output of this detector circuit is connected to the input of an adjustable attenuator 6 which determines the efficiency of the correction by the level of the image videofrequency signal applied to the control input of the correction cell 3. The correction cell is such that its gain is only modified around a frequency called the tuning frequency of the cell.

Figure 2:
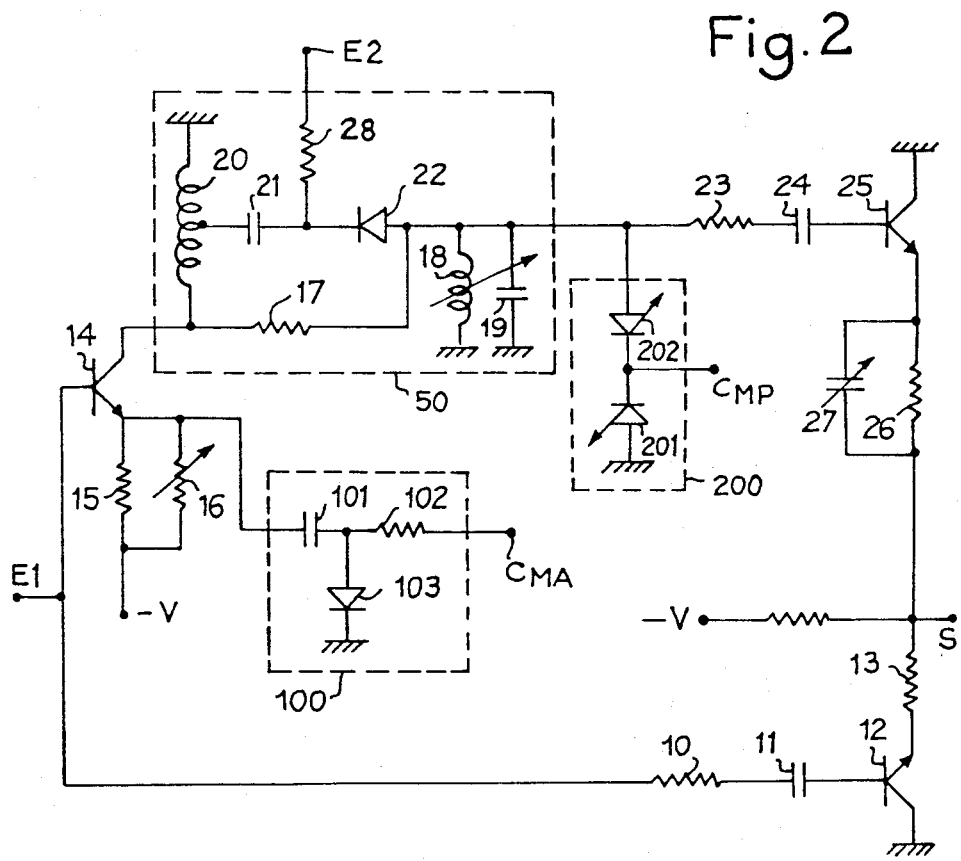
FIG. 2 is a detailed diagram of one embodiment of the correction cell used in the correction system of the invention.

A detailed diagram of one embodiment of the correction cell 3 is shown in FIG. 2. A part of the essential elements of this cell is identical to those of the group propagation time correction cell described in patent application No. 74 35448 in the name of the Applicant, for a differential phase corrector device.

In particular, input E1 of this cell is connected to its output S by two parallel channels, a direct channel and a compensated channel. This cell is distinguished from conventional group time correction cells by the fact that the transmittance of the modulation circuit of the compensated channel is constant at the tuning frequency, whatever the group delay time. Thus, the group delay time correction may be provided independently without corresponding re-adjustment of the amplitude. The direct channel comprises principally a resistor 10 and a capacitor 11 in series in the base circuit of a NPN transistor 12 whose collector is grounded and whose emitter is coupled to the output S through a resistor 13. This direct channel transmits, without modifying them, all the components (image and sound) of the intermediate frequency composite signal applied to input E1.

The compensated channel comprises a NPN amplifier transistor 14 whose base is connected to input $E_1$ whose emitter is coupled to a negative voltage source −V through a resistor 15 and potentiometer 16 circuit for adjusting the resistance in the emitter circuit. This transistor forms a constant impedance generator for the correction circuit and a separator with respect to the input impedance. The collector of transistor 14 is coupled to the group delay time modulation circuit 50, comprising a resistor 17 connected to a terminal of a tunable oscillating circuit with inductance coil 18 and capacitor 19. This modulation circuit further comprises an autotransformer 20, disposed between the collector of transistor 14 and ground, whose middle point is connected through a capacitor 21 and a PIN diode 22 to the terminal common to the oscillating circuit and to resistor 17. This same terminal is coupled to the output S of the correction cell through a resistor 23 in series with a capacitor 24, the base-emitter junction of a NPN transistor 25 and a resistor 26, the collector of the transistor being grounded. An adjustable capacitor 27 connected in parallel across resistor 26 provides phase adjustment between the direct channel and the compensated channel. Transistors 12 and 25 form a high input impedance summator. In the above description, the base biassing resistors for the transistors and the decoupling capacitors have not been shown.

In the above-described correction cell, used for differential phase correction, the current in the PIN diode 22 is modulated by a control input E2 connected through a resistor 28 to the cathode of this diode. The resistor of this PIN diode, varying with the PIN diode current, causes a modification of the surge coefficient of the slope of the phasefrequency characteristic at the tuning frequency, this slope being the group delay time, the gain of this cell being unchanged.

If the gain of this cell may be maintained constant for differential phase correction, it may also be made variable without affecting the phase.

In the correction system of the invention, for amplitude correction selective in frequency, an amplitude premodulation is applied in terms of a disturbing signal, at the frequency selected by the oscillating circuit, by varying the current in the emitter of transistor 14. For that, the correction cell further comprises, between the amplitude pre-modulation control input $C_{MA}$ and the emitter of transistor 14, an amplitude pre-modulation control circuit 100 comprising a capacitor 101 and a resistor 102, the common point between these two elements being connected to the anode of a PIN diode 103 whose cathode is connected to ground. Thus, the gain of the group delay time correction cell is increased, at the tuning frequency of this cell, in a ratio defined by adjusting the correction efficiency by means of the adjustable attenuator 6, FIG. 1.

For correcting the cross-modulation, the group delay time correction, tuned to the frequency of the intermediate frequency sound carrier by means of the oscillating circuit, provides an amplitude expansion of this frequency modulated sound carrier, as a function of the videofrequency signal applied to the control input $C_{MA}$, the crossmodulation defect introduced by the power stage being a compression of the sound as a function of the videofrequency signal.

FIG. 3 shows a signal diagram for illustrating the intermodulation distortion and the correction of this distortion by selective pre-modulation at the frequency of the sound carrier.

On the first line of this diagram is shown an image videofrequency signal formed from sync pulses and a luminance ramp, Svideo, then the envelope of the image carrier PI modulated in amplitude before and after power amplification.

In the second line of this diagram is shown the sound carrier, before and after amplification, when there is no intermodulation correction. Because of the common image and sound amplification, the sound carrier $P_S$ is amplitude modulated by the image signal and gives a distorted sound carrier $P_{Sd}$ by compression proportional to the amplitude of the image videofrequency signal. For intermodulation correction, the cell provides pre-modulation of the sound carrier by expansion proportional to the amplitude of the videofrequency signal $(P_S)_{PM}$, pre-modulated sound carrier, so that, after amplification, the sound carrier is corrected for intermodulation $(P_S)_C$ ; $(PS)_{PM}$ and $(P_S)_C$ have been shown on the last line of the diagram.

A similar cell, comprising the same control circuit, but tuned to the image carrier frequency permits correction of the amplitude distortions of this carrier which are uncorrected by other correction devices and, for example, correction of the compression of the sync pulses. For this, the signal applied to the control input $C_{MA}$ of the cell tuned to the frequency of the image carrier is formed from sync pulses, the detection circuit 5 being provided with an input $V_S$ (shown with a broken line in FIG. 1) for determining a threshold beyond which the detected signal is transmitted. The gain of the cell is then increased only for sync pulses, the threshold voltage $V_S$ being fixed so that these pulses alone are transmitted by the detecton circuit.

Similarly, a similar cell tuned to the frequency of the chrominance sub-carrier allows differential gain precorrection whose form is defined by the videofrequency modulation signal applied to the modulation control input $C_{MA}$.

FIG. 4 shows a second embodiment of the correction system of the invention applied to incidential phase correction. This correction is applied to the image carrier coming from the intermediate frequency local oscillator for correcting phase shifts of this carrier, due to the modulation videofrequency signal, by pre-modulation of the phase of this carrier. For this, modulator 30 receives the video signal, Svideo, and this phase pre-modulated carrier $(P_I)_{PM}$ from a correction cell 31 which receives at its signal input the intermediate frequency carrier FI from a local oscillator 32 and a phase pre-modulation control signal $C_{MP}$ derived from the videofrequency signal after attenuation. The intermediate frequency modulated signal available at the output of the modulator is then amplified in the FI amplifier 33 which delivers a signal $S_{FI}$. The control signal $C_{MP}$ may be derived directly from the input video signal Svideo for pre-correction or from the detected videofrequency signal after amplification by the power stage for an automatic correction system. The correction cell used in this system is the cell described above with reference to FIG. 2 but without the amplitude pre-modulation control circuit 100 but with a phase pre-modulation control circuit 200, also shown in FIG. 2, which allows the tuning conditions of the oscillating circuit 18,19 to be varied. This circuit comprises head to tail varactor diodes 201 and 202 connected in parallel across the oscillating circuit whose cathodes are connected to the control input $C_{MP}$ to vary the capacity and so the tuning frequency of the oscillating circuit. In this case, the gain of the cell is not modified but the shift of the characteristic along the frequency axis causes phase modulation which compensates for the incidential phase.

More generally, a correction system using several cells tuned to different carrier frequencies permits an adjustment, independently of the group delay time, of the amplitude and the phase of each of these carriers and control of the correction to be used for each of them for each of these parameters. At present, transmitting and re-transmitting equipment use several group delay time correction cells whose poles are spaced apart in the frequency band, so as to linearize the phase and to make the group delay time constant in the whole of the transmission band.

From these cells, it is possible to correct the different residual defects mentioned above, selectively for each of the carrier signals forming the composite signal.

For example, for the sound carrier, a correction system has been described above which acts on the crossmodulation by correction depending on the level of the image videofrequency signal. The same correction cell also allows the mean value of the sound carrier to be maintained at its nominal level. In this case, the control signal applied to the amplitude pre-modulation input of the correction cell tuned to the frequency of the sound carrier is an error signal characteristic of the difference between the means detected value and the mean nominal value of this carrier.

For that, the correction system shown in FIG. 5 comprises, connected to the intermediate frequency input $S_{FI}$ of a coupler 1 whose main output is connected to the input E1 of the correction cell 3 and whose other output is connected to the input of a band-pass filter 7 filtering the sound carrier, the output of this filter being connected to the input of amplifier 4; the output of this amplifier is connected to a mean value detection circuit 8 whose output is connected to the first input of a comparator 9, the second input of this comparator receiving a reference signal $V_R$ characteristic of the nominal mean value of the sound carrier. The output of this comparator 9 is connected to the adjustable attenuator 6 which supplies the amplitude modulation control signal $C_{MA}$ to the correction cell.

In an automatic system, regulation of the mean value of the sound carrier allows the image-sound ratio to be maintained at the nominal value provided for at transmission, this being particularly useful in re-transmitters when this ratio has been modified because of the propagation conditions between the transmitter and the re-transmitter.

While the invention has been described in connection with what is presently considered to be the most practical and preferred embodiments, it is understood that the invention is not to be limited to the disclosed embodiment but, on the contrary, is intended to cover various modifications and equivalent arrangements included within the spirit and scope of the appended claims which scope is to be accorded the broadest interpretation so as to encompass all such modifications and equivalent structures.

What is claimed is:

1. A system for pre-correcting, by intermediate frequency pre-modulation, non-linearities introduced into a high frequency amplified television signal in common channel transmission equipment having intermediate frequency stages, comprising at least one group delay time correction cell receiving said signal and having an output and placed in said intermediate frequency stages, including:

a direct channel receiving said signal and having an output;

a compensated channel receiving said signal and having an output which when added to said direct channel output comprises said cell output, including:

an amplifier receiving said signal; and a group delay time modulation circuit, connected to said amplifier, for introducing group delay time corrections to said signal at a frequency of a correction pole, said delay time modulation circuit having a group delay time control input and including an oscillating circuit for tuning said delay time modulation circuit to said correction pole frequency, said delay time modulation circuit having no effect on an amplitude of said signal at said correction pole frequency; and an amplitude pre-modulation control circuit, having a control input and an output which is connected to said amplifier, for introducing amplitude corrections of said signal at said correction pole frequency in a manner independent of said group delay time corrections.

2. A system according to claim 1 wherein said signal includes an intermediate frequency signal having a video signal and a sound signal, and wherein said cell is tuned to a frequency of said sound signal, and wherein said amplitude pre-modulation circuit control input receives a component from said video signal, whereby amplitude correction of said sound signal is accomplished by said cell.

3. A system according to claim 2 further including:
coupler means for receiving said intermediate frequency signal;
sound rejection filter means, connected to said coupler means, for receiving said intermediate frequency signal and providing said intermediate frequency video signal; and
detection circuit means for receiving said intermediate frequency video signal and providing a detected image video signal to said amplitude pre-modulation circuit control input, whereby cross-modulation correction of said signal is accomplished by said system.

4. A system according to claim 2 wherein said sound signal includes a signal characteristic of a nominal value of said sound signal, and further including:
coupler means for receiving said intermediate frequency signal;
filter means, connected to said coupler means, for receiving said intermediate frequency signal and providing said intermediate frequency sound signal;
detecting means for receiving said intermediate frequency sound signal and providing a signal characteristic of a mean value of said intermediate frequency sound signal; and
means for comparing said nominal value with said mean value and providing an output to said amplitude pre-modulation circuit control input, whereby the mean value of said sound signal is corrected by said system.

5. A system according to claim 1 wherein said signal includes an intermediate frequency signal having a sound signal and a video signal, and wherein said cell is tuned to a frequency of said video signal, and wherein said amplitude pre-modulation circuit control input receives a component from said video signal, further including:
coupler means for receiving said intermediate frequency signal;
sound rejection filter means, connected to said coupler means, for producing said intermediate frequency video signal; and
video frequency signal detecting means for receiving said intermediate frequency video signal and providing a detected video signal to said amplitude pre-modulation circuit control input, whereby amplitude correction of said video signal is accomplished by said system.

6. A system according to claim 5 wherein said video signal has synchronization pulses and a carrier frequency, and wherein said video frequency signal detecting means selects said synchronization pulses, whereby compression of said synchronization pulses is corrected, at said video carrier frequency, by said system.

7. A system according to claim 1 wherein said cell further includes a phase pre-modulation control circuit having an input and coupled to said oscillating circuit, whereby said correction pole frequency is varied.

8. A system according to claim 7 wherein said signal includes an intermediate frequency signal having a sound signal and a video signal, and wherein said cell is tuned to said intermediate frequency video signal, and wherein said phase premodulation control input receives a component of said video signal, and further including:
intermediate frequency oscillating means for providing an unmodulated intermediate frequency signal to said cell; and
intermediate frequency modulating means for receiving said video signal and said cell output and providing an intermediate frequency modulated signal, whereby incidental phase correction of said intermediate frequency video signal is accomplished by said system.

9. A system for pre-correcting, by intermediate frequency pre-modulation, non-linearities introduced into a high frequency amplified television signal in common channel transmission equipment having intermediate frequency stages, comprising a plurality of group delay time correction cells according to claim 1, wherein each said cell is tuned to a different frequency and includes a phase pre-modulation control circuit having an input and coupled to said oscillating circuit.

* * * * *